US010637884B2

(12) United States Patent
Apple et al.

(10) Patent No.: US 10,637,884 B2
(45) Date of Patent: Apr. 28, 2020

(54) ARTIFICIAL INTELLIGENCE SYSTEM AND METHOD FOR THREAT ANTICIPATION

(71) Applicant: THE BOEING COMPANY, Chicago, IL (US)

(72) Inventors: Martin A. Apple, Washington, DC (US); John A. Craig, Snohomish, WA (US); Jadranka Mead, Renton, WA (US); James Vasatka, Monroe, WA (US)

(73) Assignee: THE BOEING COMPANY, Chicago, IL (US)

( * ) Notice: Subject to any disclaimer, the term of this patent is extended or adjusted under 35 U.S.C. 154(b) by 171 days.

(21) Appl. No.: 15/870,105

(22) Filed: Jan. 12, 2018

(65) Prior Publication Data

US 2019/0222585 A1 Jul. 18, 2019

(51) Int. Cl.
*H04L 29/06* (2006.01)
*G06N 3/02* (2006.01)
*G06N 7/00* (2006.01)
*G06F 21/56* (2013.01)

(52) U.S. Cl.
CPC .......... *H04L 63/145* (2013.01); *G06F 21/566* (2013.01); *G06N 3/02* (2013.01); *G06N 7/005* (2013.01); *H04L 63/1416* (2013.01)

(58) Field of Classification Search
CPC ........ G06F 21/566; G06N 3/02; G06N 7/005; H04L 63/1416; H04L 63/145
See application file for complete search history.

(56) References Cited

U.S. PATENT DOCUMENTS

| 7,640,583 B1* | 12/2009 | Marinescu | G06F 21/55 713/187 |
| 2016/0042179 A1* | 2/2016 | Weingarten | G06F 21/566 726/23 |
| 2019/0102337 A1* | 4/2019 | Brabec | G06N 5/025 |

(Continued)

OTHER PUBLICATIONS

Kuhl et al., "Cyber Attack Modeling and Simulation for Network Security Analysis," Proc. of the 2007 Winter Simulaton Conference, IEEE, pp. 1180-1188. (Year: 2007).*

(Continued)

*Primary Examiner* — Trang T Doan
(74) *Attorney, Agent, or Firm* — MH2 Technology Law Group LLP

(57) ABSTRACT

According to various embodiments, a system for, and method of, predicting and remediating malware threats in an electronic computer network, is provided. The disclosed techniques include storing in an electronic persistent storage library data representing a plurality of malware threats, randomizing, by a computer-implemented evolution engine communicatively coupled to the electronic persistent storage library, data representing malware threats to generate data representing randomized malware threats, and evaluating, by a computer-implemented evaluation engine communicatively coupled to an output of the evolution engine and to the electronic persistent storage library, the data representing the randomized malware threats, where the evaluation engine adds data representing positively evaluated randomized malware threats to the library for proactive detection of future malware threats in the electronic computer network.

20 Claims, 10 Drawing Sheets

(56) References Cited

U.S. PATENT DOCUMENTS

2019/0104138 A1* 4/2019 Storms ............... H04L 63/1425
2019/0215329 A1* 7/2019 Levy ....................... G06F 21/56

OTHER PUBLICATIONS

Kuhl et al., "Cyber Attack Modeling and Simulation for Network Security Analysis," Proc. of the 2007 Winter Simulaton Conference, IEEE, pp. 1180-1188.

* cited by examiner

ARTIFICIAL INTELLIGENCE SYSTEM AND METHOD FOR THREAT ANTICIPATION

FIELD

This disclosure relates generally to anticipating and addressing malware threats.

BACKGROUND

The arena of cyber security threat and intrusion detection and mitigation is growing exponentially, and the advanced persistent threat lies in the energy, creativity and resources of the world of governmental, industrial, criminal and casual cyber attackers. Traditional defenses that rely upon detection, analysis and reaction are insufficient in the onslaught of threats that are encountered every day. The non-criminal world moves slowly, relying upon debate, consensus and jurisprudence to restore confidence and trust in our institutions. This pace is glacial in comparison with the hypersonic speed of the un-thwarted and un-restrained attackers of our information systems.

Evolution is the heart of new ideas. They are created through the processes randomly arising out of a myriad of related issues and then facing the tests of survival in the arena of logical thought and practical applications.

Neural networks are early models for learning machines, being proposed for development and implementation in the middle of the 20$^{th}$ Century. A neural network is a model based upon the structure of the neural networks in the human brain and classically consists of a large number of neuron-models, developed as computational devices, and connected together in a complex network for communication.

The primary difference between an artificial neural network and the brain lies in the increased complexity of neural nodes and interconnection pathways in the human brain that show a high degree of randomness in comparison with the more formally rigid interconnectivity of the neural network computational devices. Introduction of randomness in the artificial network has not been sufficiently pursued to prove or disprove its value in an artificial learning machine. As the actual human brain network is increasingly understood in the future there may be an opportunity to devise a more sophisticated neural network model of the brain.

An example of a traditional approach to cyber security that does not include any forecasting is the MITRE proposal for a World-Class Cybersecurity Operations Center. See Carson Zimmerman, "Ten Strategies of a World-Class Cybersecurity Operations Center," MITRE 2014. This proposal does call for a Red Team that is mandated to "actually execute an attack covering the entire cyber-attack life cycle against a segment of the enterprise that is important to the constituency mission." Id. However there is no role for threat anticipation in the proposal, instead it relies upon conventional and documented antivirus and antispyware, all of which are well known and understood by threat developers and therefore easily overcome by malfeasants. The MITRE threat assessment requires that the Cyber security Operations Center "understands the adversary and effectively responds to incidents", which is unfortunately an after-the-fact reaction to a persistent and successful intruder. See id. This approach is not conducive to solving the cyber threat atmosphere that is growing exponentially across the globe.

Thus, there is a lack of capability for anticipating cyber-threats, other than through the employment of Red Teams and the development of realistic and meaningful advanced area scenarios. The number of scenarios is very large and thus impractical to explore within a reasonable time. The current ability to anticipate the developments of the creative and dedicated minds of individuals and governmental cyber attackers and malign organizations to intrude upon our information security is nearly zero. Traditional response-to-attack methods are only effective after the damage has been perpetrated, and the delay times between successful intrusion and detection and defensive response continues to be measured in months rather than seconds.

SUMMARY

According to some embodiments, a computer-implemented system for predicting and remediating malware threats in an electronic computer network is disclosed. The system includes an electronic persistent storage library storing data representing a plurality of malware threats; a computer-implemented evolution engine communicatively coupled to the electronic persistent storage library and configured to receive the data representing the plurality of malware threats from the electronic persistent storage library and randomize data representing malware threats to generate data representing randomized malware threats; and a computer-implemented evaluation engine communicatively coupled to an output of the evolution engine and to the electronic persistent storage library and configured to receive the data representing the randomized malware threats from the evolution engine and evaluate the data representing the randomized malware threats; where the evaluation engine adds data representing positively evaluated randomized malware threats to the electronic persistent storage library for proactive detection of future malware threats in the electronic computer network.

Various optional features of the above embodiments include the following. The system may include a malware detection engine communicatively coupled to the electronic persistent storage library and to the electronic computer network and configured to detect malware in the electronic computer network corresponding to the positively evaluated randomized malware threats. The evolution engine may include a randomizer including electronically stored implementations of a plurality of randomizing algorithms. The plurality of randomizing algorithms may include two or more of: a bit extraction and manipulation algorithm, a signature reordering and relocation algorithm, a signature substitution algorithm, a signature recombination algorithm, a signature transfer engine, or a signature obfuscation algorithm. The plurality of randomizing algorithms may include a generative artificial intelligence algorithm. The randomizer may be configured to parse the data representing malware threats into individual concepts and to select and apply at least one of the randomizing algorithms to parts of the parsed data representing malware threats. The evaluation engine may include a Bayesian probability analysis generator configured to evaluate a conditional probability of a new malware threat event based on contents of the electronic persistent storage library. The system may be installed on the electronic computer network and configured to continuously add detected malware threat data to the electronic persistent storage library. The electronic persistent storage library may include a portion for storing data representing factual malware threats and a portion for storing data representing fictional malware threats. The evolution engine may include a probability generator configured to evaluate probabilities that the randomized malware threats are valid malware threats.

According to some embodiments, a method for predicting and remediating malware threats in an electronic computer network is disclosed. The method includes storing in an electronic persistent storage library data representing a plurality of malware threats; randomizing, by a computer-implemented evolution engine communicatively coupled to the electronic persistent storage library, data representing malware threats to generate data representing randomized malware threats; and evaluating, by a computer-implemented evaluation engine communicatively coupled to an output of the evolution engine and to the electronic persistent storage library, the data representing the randomized malware threats; where the evaluation engine adds data representing positively evaluated randomized malware threats to the electronic persistent storage library for proactive detection of future malware threats in the electronic computer network.

Various optional features of the above embodiments include the following. The method may include detecting, by a malware detection engine communicatively coupled to the electronic persistent storage library and to the electronic computer network, malware in the electronic computer network corresponding to the positively evaluated randomized malware threats. The randomizing may include randomizing by a plurality of randomizing algorithms. The plurality of randomizing algorithms may include two or more of: a bit extraction and manipulation algorithm, a signature reordering and relocation algorithm, a signature substitution algorithm, a signature recombination algorithm, a signature transfer engine, or a signature obfuscation algorithm. The plurality of randomizing algorithms may further include a generative artificial intelligence algorithm. The randomizing may include parsing the data representing malware threats into individual concepts and selecting and applying at least one of the randomizing algorithm to parts of the parsed data representing malware threats. The method may include evaluating, by a Bayesian probability generator of the evaluation engine, a conditional probability of a new malware threat event based on contents of the electronic persistent storage library. The method may include continuously detecting malware threats in the electronic computer network, and adding to the electronic persistent storage library, malware threat data. The method may include storing data representing factual malware threats in a portion of the electronic persistent storage library for storing data representing factual malware threats, and storing data representing fictional malware threats in a portion of the electronic persistent storage library for storing data representing fictional malware threats. The method may include evaluating, by a probability generator of the evolution engine, probabilities that the randomized malware threats are valid malware threats.

BRIEF DESCRIPTION OF THE DRAWINGS

Various features of the examples can be more fully appreciated, as the examples become better understood with reference to the following detailed description, when considered in connection with the accompanying figures, in which.

DESCRIPTION

Reference will now be made in detail to the disclosed examples, which are illustrated in the accompanying drawings. Wherever possible, the same reference numbers will be used throughout the drawings to refer to the same or like parts. In the following description, reference is made to the accompanying drawings that form a part thereof, and in which is shown by way of illustration specific examples. These examples are described in sufficient detail to enable those skilled in the art to practice them and it is to be understood that other examples may be utilized and that changes may be made without departing from the scope of the disclosure. The following description is, therefore, merely exemplary.

Disclosed are systems and methods for anticipating or predicting cyber threats prior to their development by malfeasants. In particular, some embodiments provide anticipatory systems and methods based upon the random evolution of new threats and malware from the libraries of existing and developing threats, and the appropriate evaluation of the efficacy and applicability of these evolutionary threats, e.g., following a Bayes' Probabilistic survival evaluation process that rests firmly upon the real characteristics of the information and human responsiveness domains. Some embodiments permanently and continuously run artificially intelligent predictive systems and methods that continuously examine new and developing threats, forecast the next generation of threats a priori (reasoning based on theoretical deduction rather than from observation), and add all existing, new and encountered threats into an expanding data library. These and other embodiments are disclosed in detail presently.

Figure 1:
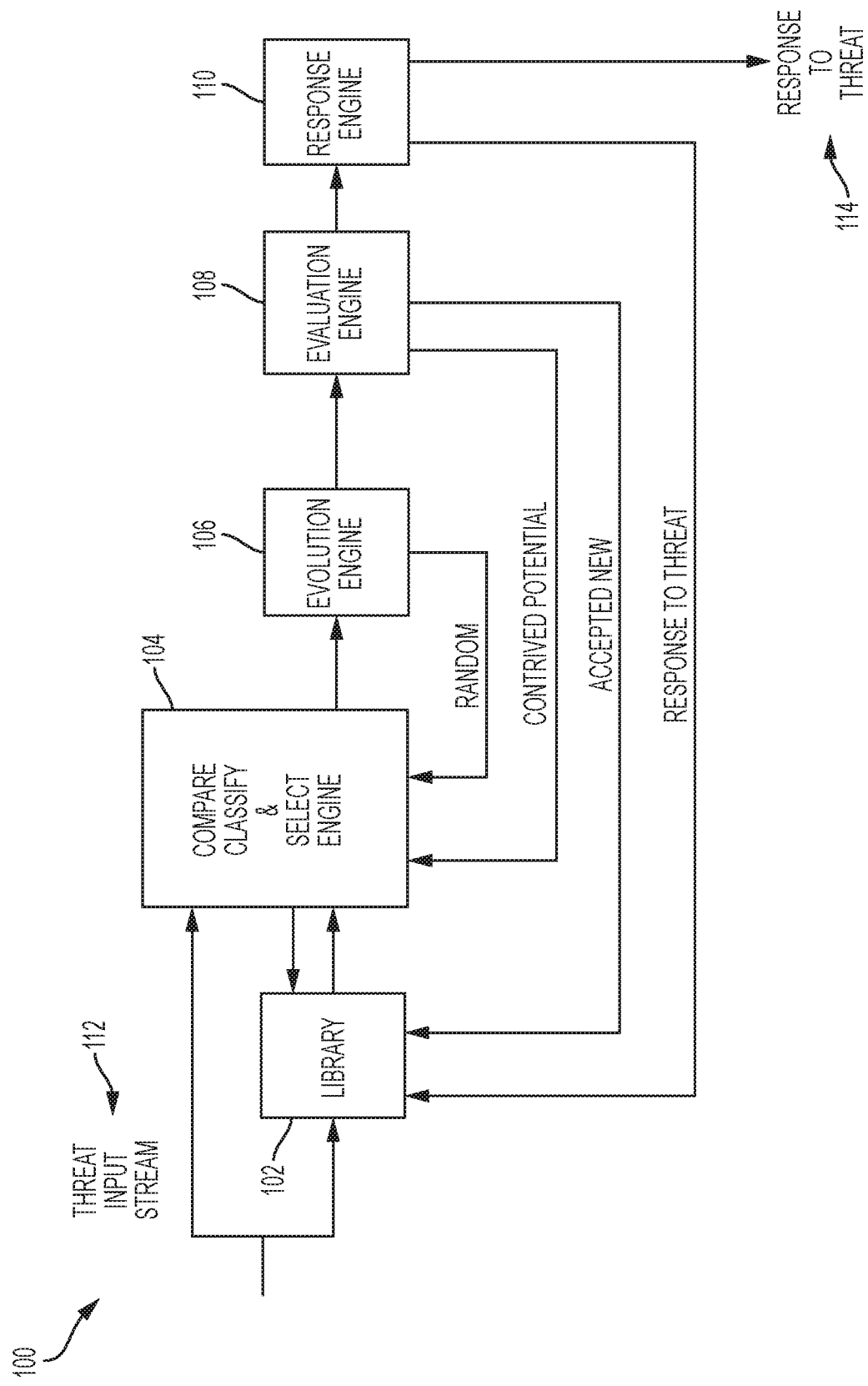
FIG. 1 is a schematic diagram of a system according to various embodiments.

FIG. 1 is a schematic diagram of a system 100 according to various embodiments. In particular, FIG. 1 illustrates an example architecture for system 100, including library 102, compare, classify, and select engine 104, evolution engine 106, evaluation engine 108, and response engine 110. In such embodiments, threat input stream 112, also referred to as the "bases", is produced by a continuous monitoring of cyber intrusion and detected cyber-threat, e.g., in an enterprise system. Those data form inputs to the library 102 and, via compare, classify, and select engine 104, to evolution engine 106. The output from evolution engine 106, described in detail below, includes new and/or modified events and threats. They are the primary input to evaluation engine 108, described in detail below. Evaluation engine 108 outputs positively evaluated (described below) new and/or modified events and threats to response engine 110, which provides threat responses 114. The threat responses may include one or more of: malware removal applications, malware prevention applications (e.g., "patches"), malware honeypot applications, or the identification (e.g., by way of a hyperlink to a copy) of any of the preceding. The threat responses may be automatically implemented, or a message may be sent or presented to a human user alerting him or her to the threat(s) and corresponding threat response(s).

According to some embodiments, system 100 operates continuously as a perpetual threat anticipator.

Figure 2:
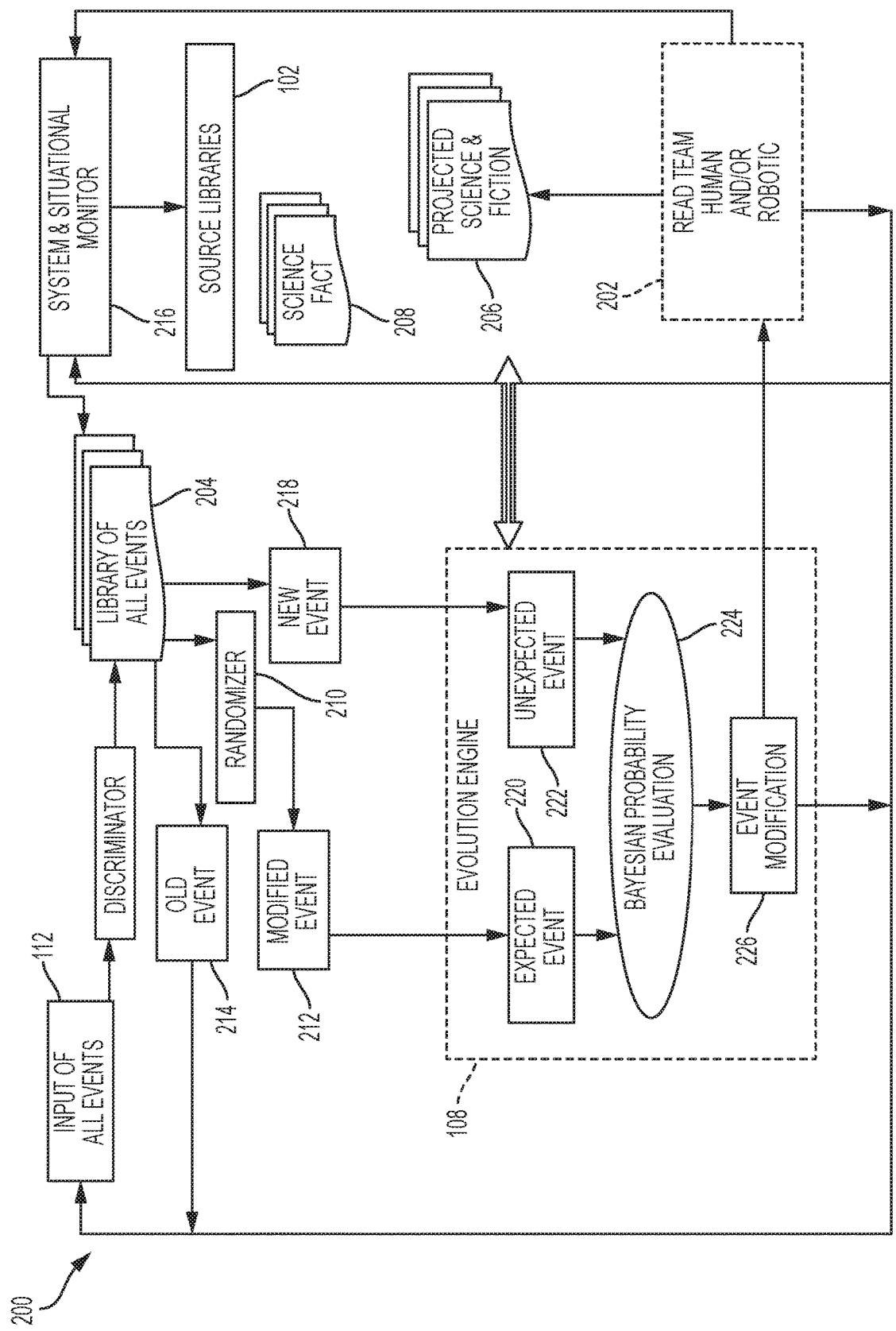
FIG. 2 is a schematic diagram of a system according to various embodiments.

FIG. 2 is a schematic diagram of a system 200 according to various embodiments. System 200 shares commonalities with system 100, but also includes some differences. Thus, the depiction of system 200 in FIG. 2 details some portions of system 100, as well as portions that are not part of system 100.

System 200 includes library 102. Library 102 may be implemented as electronic persistent storage, e.g., one or more hard disk drives. Library 102 includes library of all events 204, which stores events from threat input stream 112. Library 102 includes copies of existing and newly-generated evolved malware signatures, which in general may include the entire malware code. Library 102 may be made available to security-assured developers, e.g., as an open cloud-based resource. Maintaining library 102 such that it is up-to-the-minute on cyber threats and corresponding defenses is useful for global security of information storage and transfer and generation systems. Library 102 may include a differentiated catalog of "Science Fact" 208 and "Science Fiction" 206, e.g., with a graded distinction that shows a level of fact versus fiction through a numeric assessment, for example. One or more humans, referred to herein as "red team" 202, may be used to ensure the accuracy of such a numeric evaluation.

As noted, some embodiments may include human involvement in an organized and thoughtful arena as a competent red team 202. A function of such a red team 202 is to monitor the veracity and applicability of system 200, and to create scenarios where that threat assessments are most appropriate. Such a red team 202 may also realistically differentiate between "science fact" and "science fiction" for entries in library 102.

System 200 includes elements that form an evolution engine, including randomizer 210, described in detail below in reference to FIG. 3. Randomizer 210 accepts an existing event from library of all events 204 and generates modified event 212, which is provided to evaluation engine 108. Old events 214 is provided by library of all events 204 to system and situational monitor 216 for inclusion in library 102.

Evaluation engine 108 accepts modified event 212 and new event 218, which are inputted as expected event 220 and unexpected event 222 for a Bayesian probability evaluation 224, described further below in reference to FIG. 3. Bayesian probability evaluation 224 provides an output to event modification block 226, which forwards the output to system and situational monitor 216. Evaluation engine 108 is further described in reference to FIG. 9, below.

Figure 3:
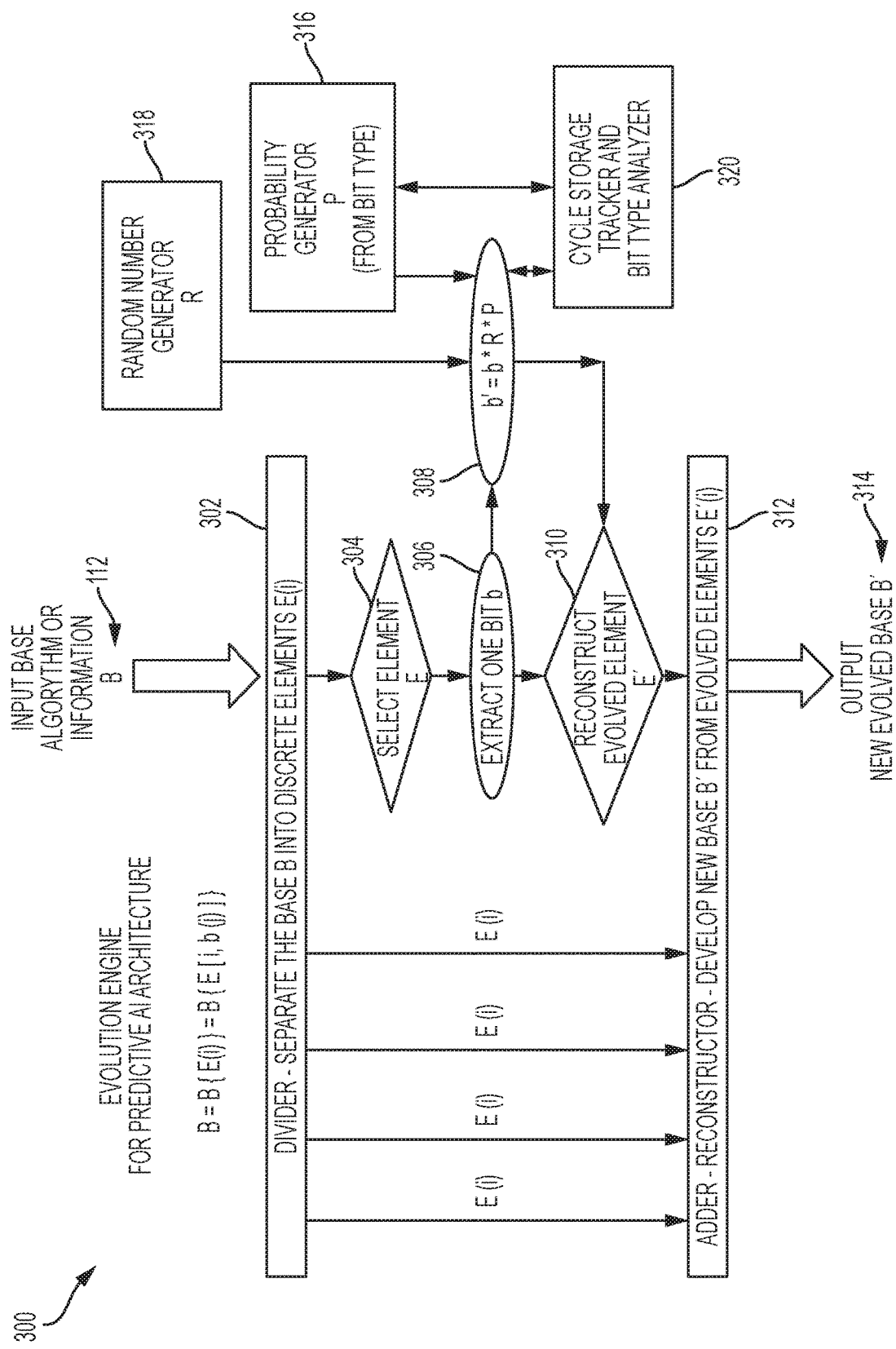
FIG. 3 is a schematic diagram of an evolution engine according to various embodiments.

FIG. 3 is a schematic diagram of an evolution engine 300 according to various embodiments. Evolution engine 300 accepts as input the threat input stream 112. From threat input stream 112, divider 302 parses the threats into discrete elements. These elements are handled by a randomizer portion of evolution engine 300.

Collectively, random number generator 318 and probability generator 316 form a randomizer, as randomizer 210. The goal of the randomizer is to generate software signatures that have been evolved from previously known malware signatures. These evolved signatures are new in that they have not been previously observed to exist in practice in any existing malware. These signatures can also be considered to be potential cyber-security threat signatures.

Note that, as used herein, a "signature" may be hashes and other mathematical computations over the code base, but also other identifying artifacts that a malware contains, such as individual significant distinguishing portions or paragraphs of code, function calls, access instructions, device level instructions, communication protocol services or protocol data unit contents, and similar. Thus, a malware or software signature is used to denote any artifact that can help identify a malware. The individual artifacts are referred to as "concepts" herein. The evolution engine 300 may include an optional concept generator followed by a signature generator. The signature generator may aggregate concepts into a set of concepts that belong to a potential new signature.

As shown, evolution engine 300 includes a particular randomizer that selects and randomizes bits. Threat input stream 112 includes individual threat B, which may be a word, a computer-readable concept, a computer-readable expanded threat, a computer-readable computational algorithm, a computer-readable malware program, or a computer-readable element of information. The threat B is divided or separated into component elements $E[i]_{i=1,\ldots,N}$. These separate elements $E[i]$ are themselves composed of bits, $E[i]=b_i(j)_{j=1,\ldots,M}$. The example randomizer of FIG. 3 automatically and randomly selects a single element, denoted E 304, and divides it further into discrete bits, b 306, which are changed randomly. The random bit b' 308, is then recombined into a new element, E' 310, that is subsequently combined into a new base, B' 314. In more detail, the randomizer selects an element E 304, extracts a bit b 306 (for example), and replaces it with a random bit b'=bRP 308, where R is supplied by random number generator 318 and P is supplied by probability generator 316, described further below. The result is evolved element E' 310. As depicted, adder-reconstructor 312 creates new base B' 314 of evolved malware threats from the individual evolved elements. Other embodiments may include additional or alternative randomizer that operate on different threat stream portions and/or that manipulate threat elements differently.

An aspect of evolution engine 300 is an associated probability generator 316, which may be unique to the individual bit type encountered. This represents differentiation for the unique character of the predicted area of application, cyber security and cyber threats, in this case. Probability generator 316 may be omitted, e.g., in embodiments in which the characteristic bits of the input stream are compatibly similar. As explained above, probability generator 316, together with random number generator 318, provides parameters for randomizing extracted bit b 306, to produce random bit b' 308. Cycle storage tracker and bit type analyzer 320 tracks bit modifications and assists in selecting a particular probability generator for the particular bit type encountered.

FIGS. 4-8 present example alternative randomizer architectures and functionalities according to some embodiments. That is, various embodiments may include one or more randomizers devoted to various randomization procedures. The following paragraphs and FIGS. 4-8 present example such randomizers.

A first type of randomizer involves random bit extraction and manipulation. An example of this type of randomizer is presented above in reference to FIG. 3. A second type of randomizer works at the level of concepts rather than individual bits, and is presented below in reference to FIGS. 4-8.

Figure 4:
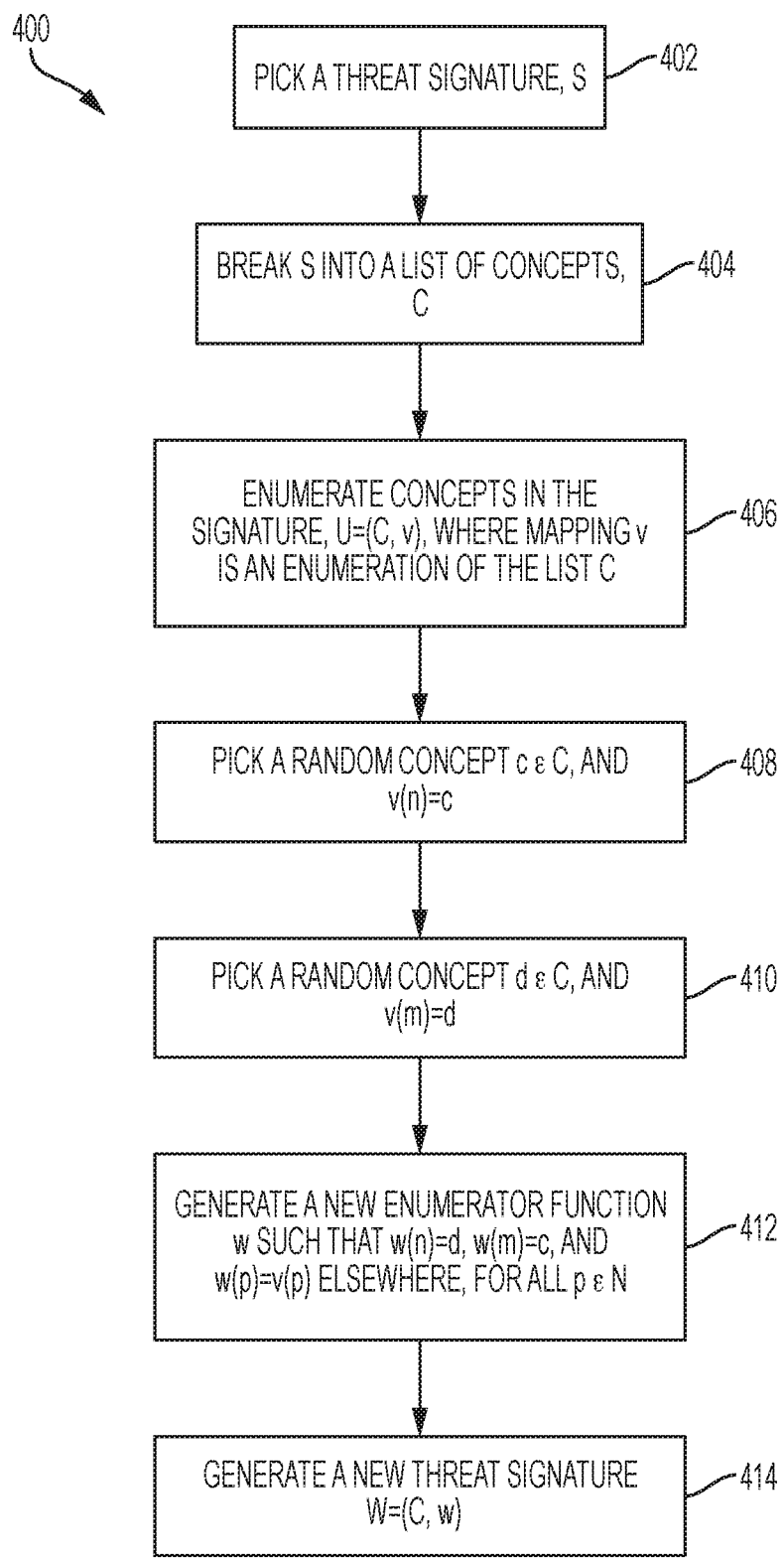
FIG. 4 is a flowchart of a threat signature relocation technique according to various embodiments.

FIG. 4 is a flowchart of a threat signature concept relocation technique 400 according to various embodiments. This approach generates random re-ordering of existing concepts within one malware signature. For malware signatures that contain, for instance, only software code paragraphs, this approach generates malware signature by random reordering of software code paragraphs. Thus, divider 302 of evolution engine 300 parses at the code paragraph level for this technique. The new signature contains known malware concepts, but in a different order. For this technique, the evaluation algorithm (e.g., as implemented by evaluation engine 108 of FIG. 1) discards malware that is not executable due to code dependencies being disrupted.

At block 402, technique 400 randomly selects a threat signature S.

At block 404, technique 400 parses S into its constituent concepts.

At block 406, technique 400 enumerates the individual concepts.

At block 408, technique 400 randomly selects a first individual concept.

At block 410, technique 400 randomly selects a second individual concept, different from the first individual concept.

At block 412, technique 400 generates a new enumeration that exchanges the locations of the first and second individual concepts.

At block 414, technique 400 generates a new threat signature from the new enumeration and the individual concepts from threat signature S.

Figure 5:
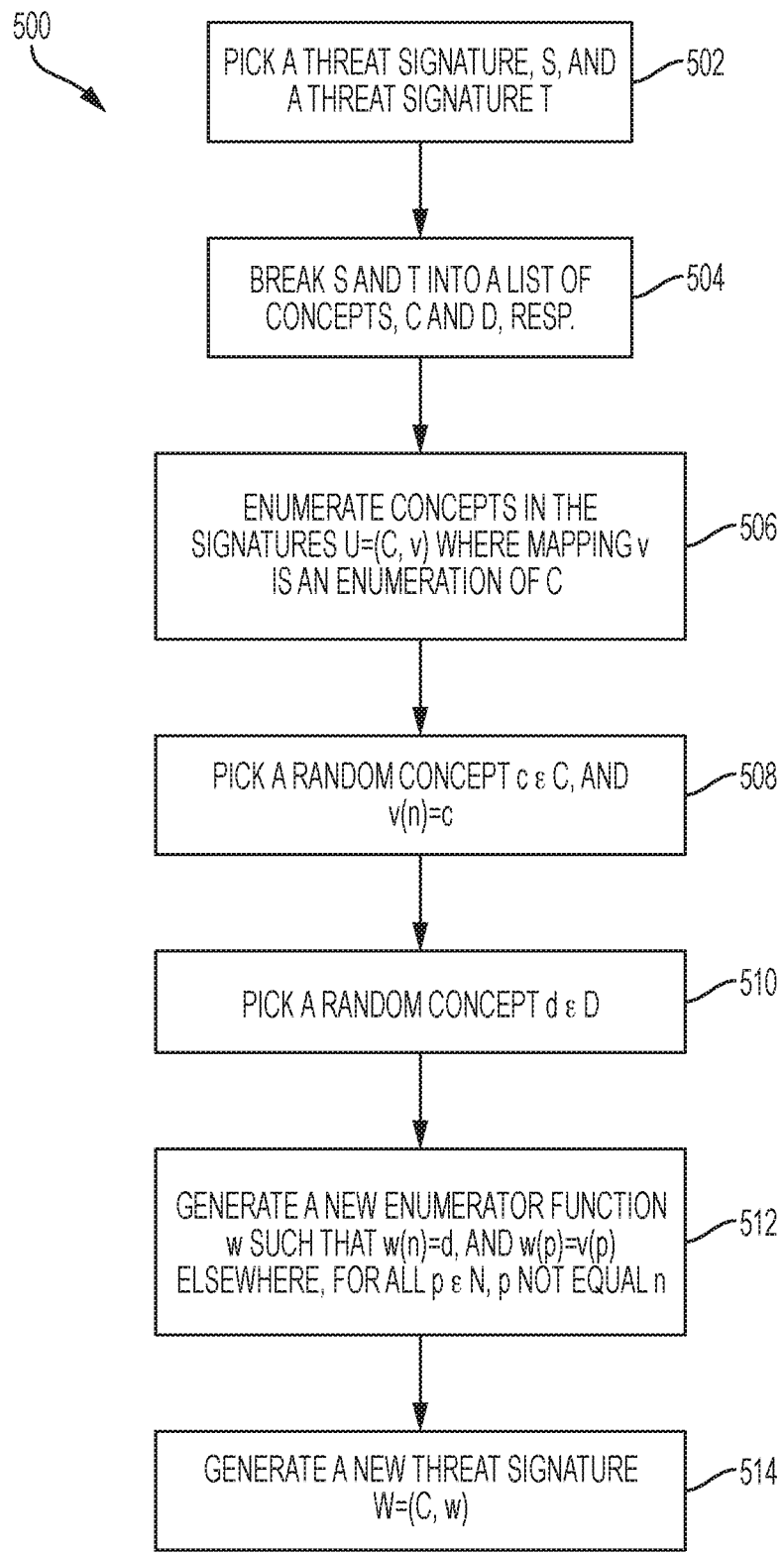
FIG. 5 is a flowchart of a threat signature substitution technique according to various embodiments.

FIG. 5 is a flowchart of a threat signature concept substitution technique 500 according to various embodiments. This approach generates a new malware signature by randomly substituting one concept in an existing malware signature by a randomly picked concept from another malware signature. This is a one-to-one substitution. For example, a phishing attack code can be substituted by a code that an insider would use to enter a target system.

At block 502, technique 500 randomly selects first and second threat signatures.

At block 504, technique 500 parses the first and second threat signatures into individual concepts.

At block 506, technique 500 enumerates the concepts in the first threat signature.

At block 508, technique 500 randomly selects a first concept from the first threat signature.

At block 510, technique 500 randomly selects a second concept from the second threat signature.

At block 512, technique 500 generates a new enumeration function for the first threat signature, with the second concept substituted for the first concept according to the new enumeration.

At block 514, technique 500 generates a new threat signature from the new enumeration.

Figure 6:
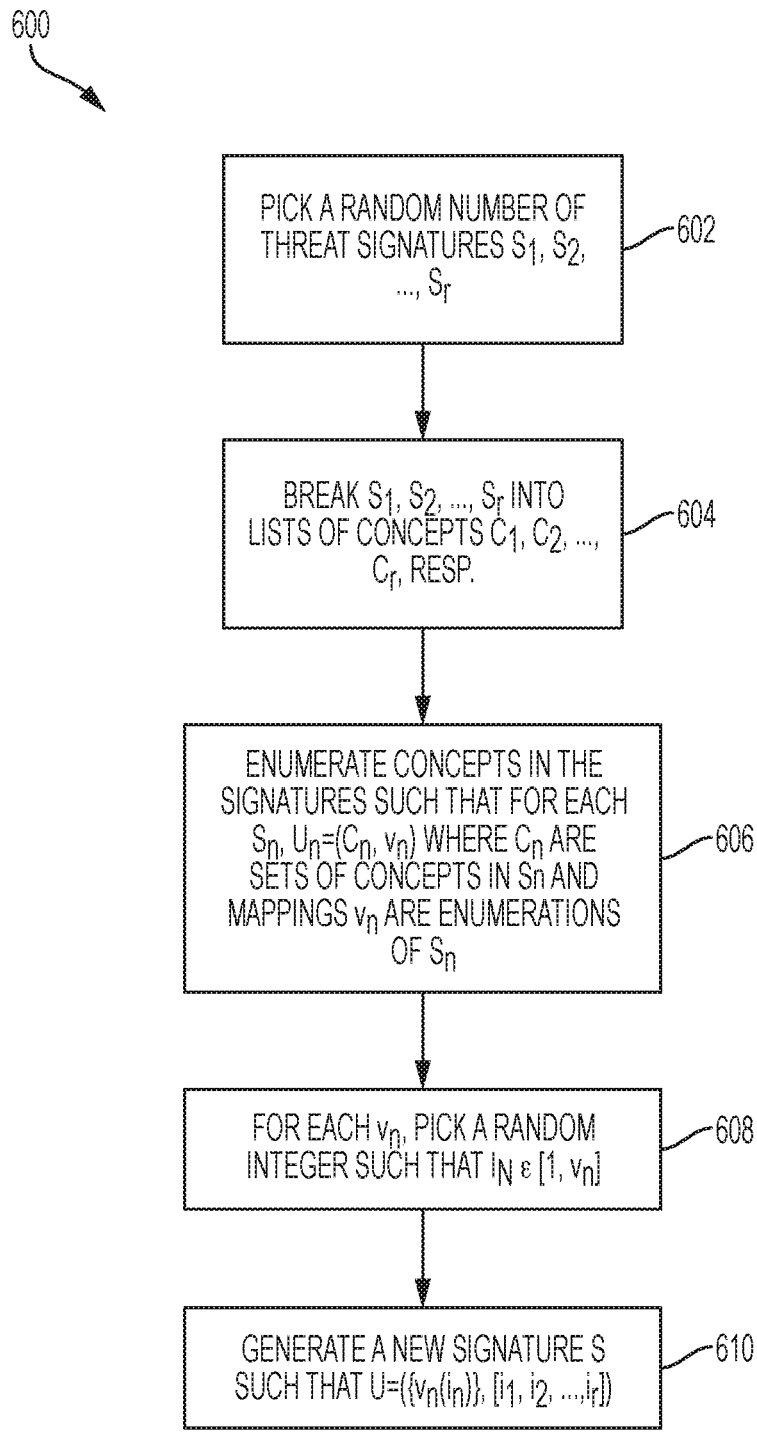
FIG. 6 is a flowchart of a threat signature recombination technique according to various embodiments.

FIG. 6 is a flowchart of a threat signature concept recombination technique 600 according to various embodiments. Technique 600 is similar to technique 500 except that instead of a single substituted concept from a single malware signature, multiple concepts, potentially from multiple malware signature, are substituted. Thus, technique 600 generates a new malware signature by using a random number of randomly selected concepts from several different randomly selected malware signatures.

At block 602, technique 600 generates a random number and uses it to select a random number of threat signatures from the library of threat signatures.

At block 604, technique 600 parses each selected threat signature into constituent concepts.

At block 606, technique 600 generates one enumeration function for each of the selected threat signatures, where each enumeration function enumerates the concepts in its respective threat signature.

At block 608, technique 600 effectively selects a random concept from each selected threat signature by utilizing the enumeration functions from block 606 together with a random integer with which to evaluate the enumeration function.

At block 610, technique 600 generates a new enumeration, which enumerates the random concepts selected at block 608 into a new threat signature.

Figure 7:
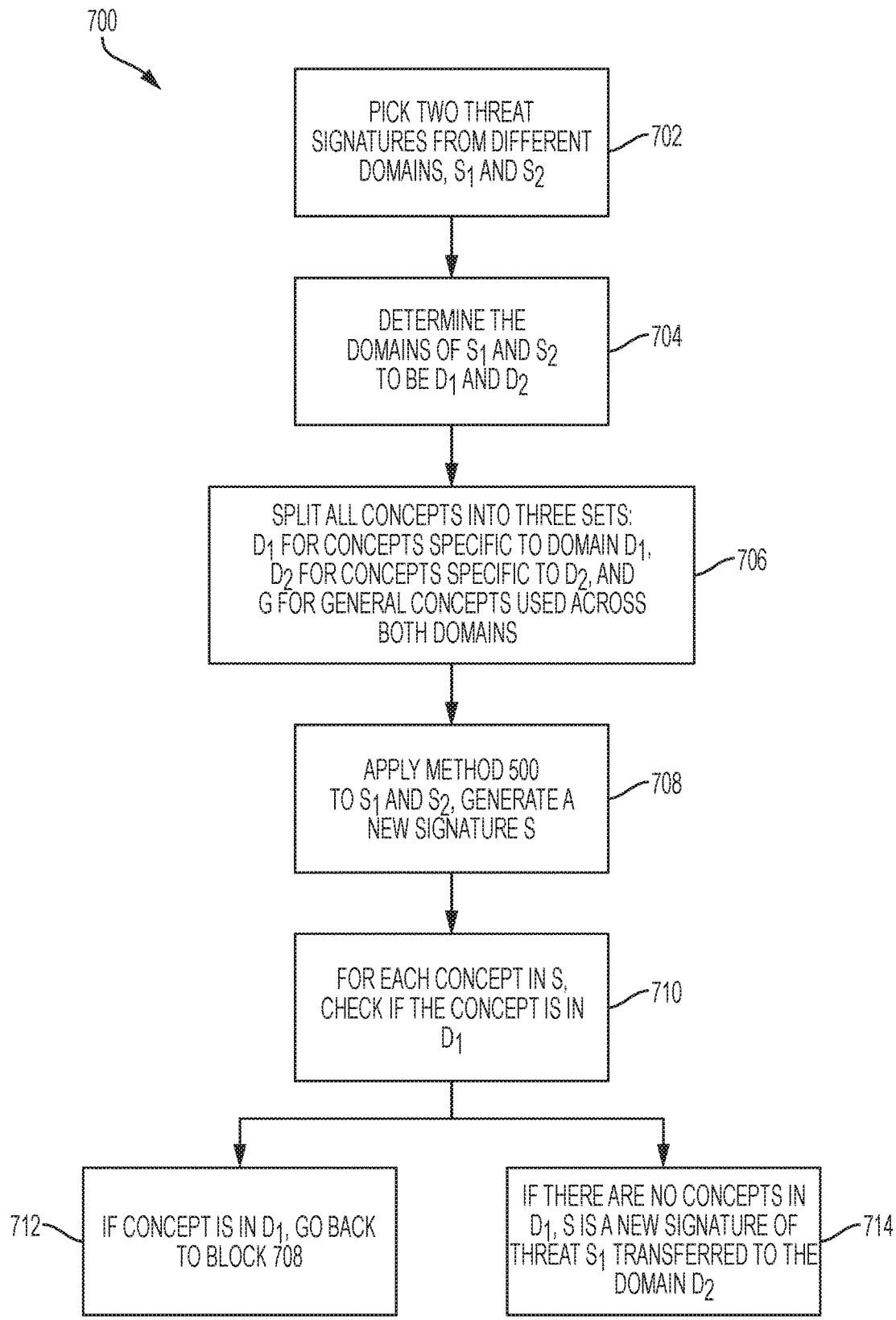
FIG. 7 is a flowchart of a first threat signature transfer technique according to various embodiments.

FIG. 7 is a flowchart of a first threat signature transfer technique 700 according to various embodiments. This approach generates a new malware signature by transferring the intended malware operation from one domain to another, e.g., financials to healthcare. The pertinent malware signature features predominantly used in one domain may be substituted by features used in another domain (e.g., account numbers: balance figures to health information). This would either be done by generating brand new concepts to support operations in a new domain, or by reusing concepts from the new domain if they already exist in some previously known malware signature.

At block 702, technique 700 randomly selects a first threat signature from a first domain and a second threat signature from a second domain, where the first domain is different from the second domain.

At block 704, technique 700 determines the respective domains of the first and second threat signatures.

At block 706, technique 700 sorts the concepts from the first and second threat signatures into concepts exclusive to the first threat signature, concepts exclusive to the second threat signature, and concepts common to both the first and the second threat signatures.

At block 708, technique 700 applies technique 500 to the first and second threat signatures, to generate a new threat signature.

At block 710, technique 700 determines whether each of the concepts in the new threat signature are in the domain of the first threat signature.

At block 712, for any concepts that are in the domain of the first threat signature, technique 700 loops back to block 708.

At block 714, if no concepts in the new threat signature are in the domain of the first threat signature, then the new signature is output.

Figure 8:
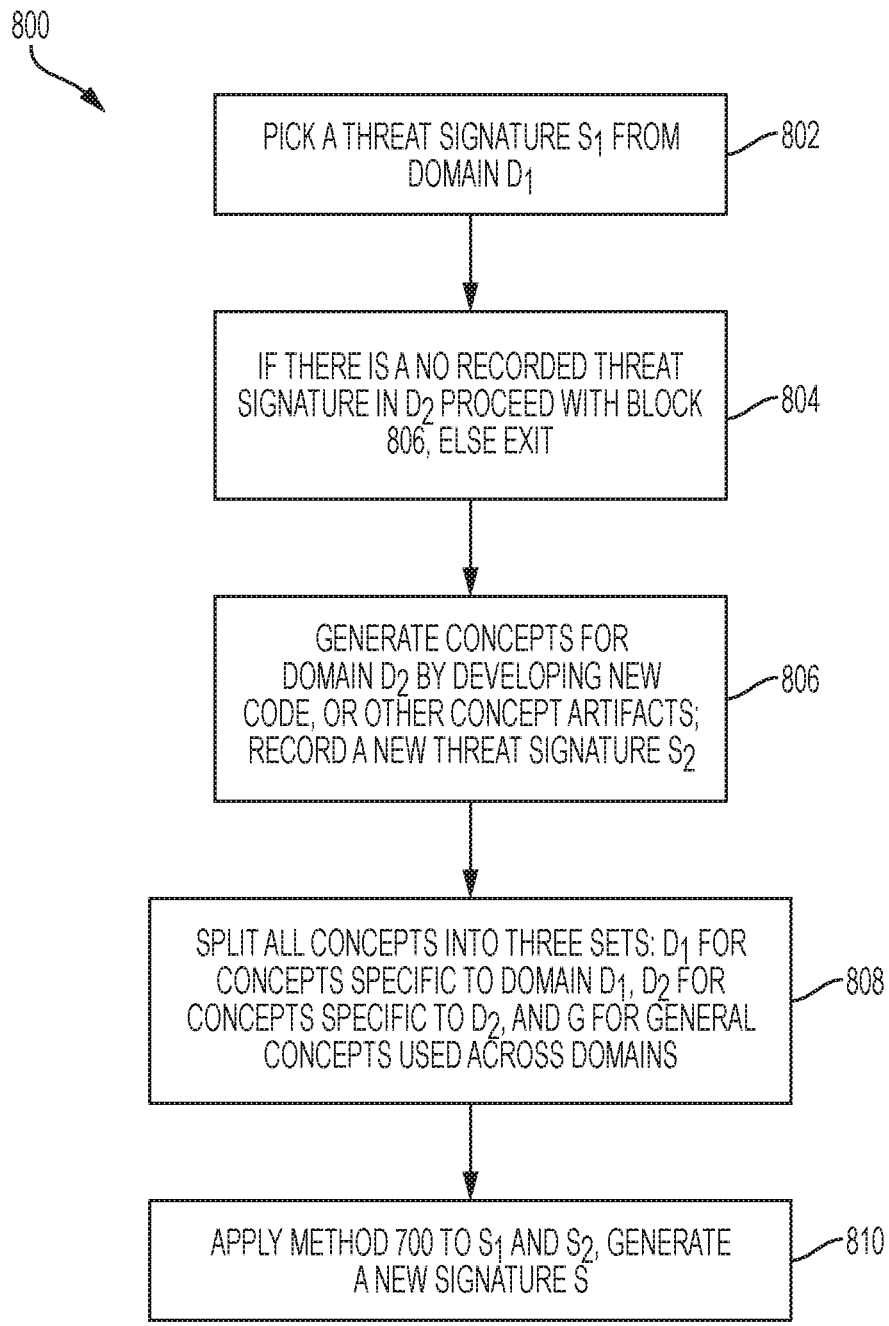
FIG. 8 is a flowchart of a second threat signature obfuscation technique according to various embodiments.

FIG. 8 is a flowchart of a second variant of the threat signature transfer technique 800 according to various embodiments. This technique may be applied when technique 700 is not feasible due to the reason that there are no known signatures in a new target domain to which to apply (transfer) an already known signature. Note that if there are known signatures in the new target domain, then this technique may terminate and instead use concepts from those signatures to substitute for the concepts in the original signature domain, e.g., method 700. Here, brand new concepts for the target domain are generated, to use those to transfer the original signature to this domain. This is, for instance, how typical information technology (IT) threats may be transferred to the aviation domain.

At block 802, technique 800 randomly selects a first threat signature from a first domain.

At block 804, technique 800 determines whether a randomly selected second domain includes any threat signatures. If so, then the process terminates, as technique 700 is applied. If not, then control passes to block 806.

At block 806, technique 800 generates new concepts for the randomly selected second domain. These new concepts are recorded in a new, second, threat signature in the second domain.

At block 808, technique 800 sorts the concepts from the first and second threat signatures into concepts exclusive to the first threat signature, concepts exclusive to the second threat signature, and concepts common to both the first and the second threat signatures.

At block 810, technique 800 applies technique 700 to the first and second threat signatures to generate a new, third, threat signature, which technique 800 outputs.

An additional technique, for threat signature obfuscation, is described presently. Such a technique inserts random concepts in between valid malware signature concepts. The inserted concepts can be from other malware signatures or brand new concepts. Note that it is not necessary for these concepts to make sense (computationally) either by themselves or in combination. Their role is to disrupt potential detection process of the signature itself.

The randomizers described in reference to FIGS. 3-8 may all operate according to the following general steps. First, start with known malware signature(s). Second, determine the level of randomization (analogous to selecting the random number interval). Third, parse malware signature(s) into individual concepts. Fourth, apply one of the techniques to individual concepts. Fifth, follow with another technique, until the level of randomization is achieved.

Finally, generative neural networks may be used to generate new threat signatures, with the goal of the new signature to look as much as possible as a real cyber-attack signature would. In general, automated methods such as neural networks can be used to generate new signatures. Generative adversarial networks are viewed as particularly appropriate. Such networks take as input collection of known signatures and run them through a neural network architecture, which generates new signatures. In general, using generative neural networks as randomizers involves a different workflow in comparison to the techniques shown and described above in reference to FIGS. 3-8.

Note that applying randomizers as disclosed herein does not generate new malware. No executable code necessarily gets generated, with the possible exception of techniques 700 and 800. Instead, the generated concepts and their patterns are potentially indicative of a specific malware, and are meant to recognize malware by using that signature. These new, previously unseen, signatures are more effective for cyber incident detection than hash codes, because they are more resilient to obfuscation. Also, they are more effective using the measure of fewer false positives: these signatures include patterns of concepts, rather than individual concepts, and thus have a stronger discriminative power.

Table 1 provides an example of a random malware signature generation. The leftmost column illustrated modular malware code, and the next two columns represent the effects of applying the indicated randomization techniques.

TABLE 1

| Known Malware | Apply Technique 500 | Apply Technique 600 |
|---|---|---|
| Code for email phishing campaign | Code for intrusion using USB device (from a different known malware instance) | Code for intrusion using USB device (from a different known malware instance) |
| Code for gathering system data | Code for gathering system data | Code for gathering system data |
| Code for web site defacing | Code for web site defacing | Code for stealing health records |
| Code for covering the tracks/come back later | Code for covering the tracks/come back later | Code for covering the tracks/come back later |

Figure 9:
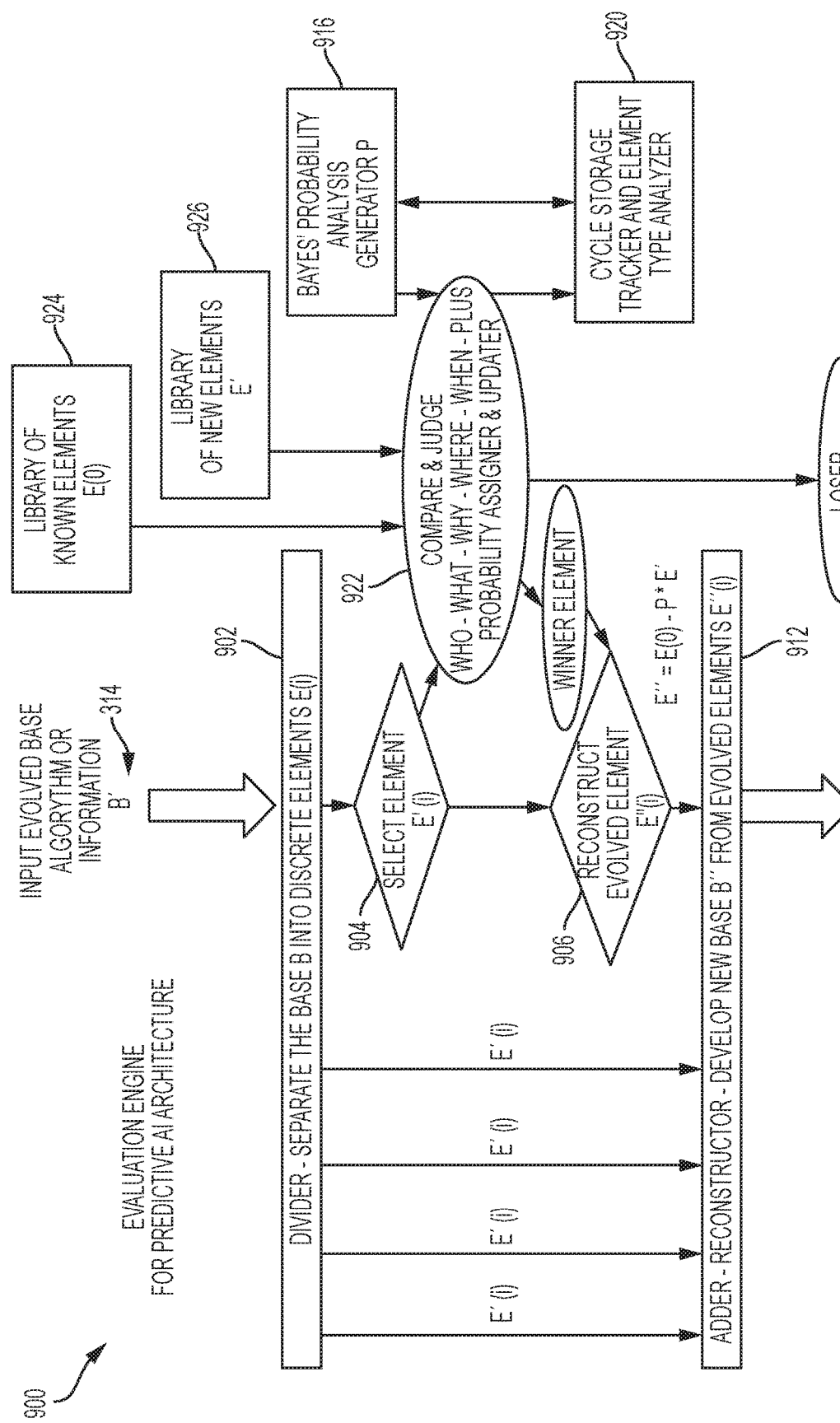
FIG. 9 is a schematic diagram of an evaluation engine according to various embodiments.

FIG. 9 is a schematic diagram of an evaluation engine 900 according to various embodiments. Evaluation engine 900 is similar to evolution engine 300 of FIG. 3 in its basic architecture. For example, the input base, B' 314 (which may be a computer-readable: word, concept, expanded threat, or element of information) is parsed into component elements by divider 902. These separate elements are treated individually by automatically and randomly selecting a single element, E' 904, which can be changed randomly. The randomized new element, E"(i) 906, is then recombined into a new element E" by adder-reconstructor 912, and new element E" is subsequently combined into a newly modified output Base, B" 914.

According to some embodiments, evaluation engine 900 also includes Bayes' probability generator 916, which is unique to the cyber-threat base and element types encountered. In some embodiments, Bayes' probability generator 916 may be omitted. "The important part of Bayes' Theorem is the observation of previous events, or your degree of belief that something will occur." Ronald Walpole and Raymond Myers, "Probability and Statistics for Engineers and Scientists", Macmillan, 1978, Bayes' Theorem, Chapters 2 and 6. This is a component of the disclosed techniques for the forecasting of cyber threats according to some embodiments.

The application of Bayes' theorem allows embodiments to calculate the conditional probability of a new event based upon our assessment or knowledge of the individual probabilities of occurrence and expectation. These foundation conditional probabilities can be initially set through appropriate human judgment but are easily and automatically refined and improved through the repeated cycles of evaluation of hypothetical events compared with actual events.

One limitation, the potential generation of false positives, is not a critical concern in the cyber threat prediction application of Bayes' theorem. False positives may be created, but they are useful for a robust evolutionary model. It is the function of discriminator 922 in evaluation engine 900 to make the initial judgments on false positives as part of the selection of winner and loser events.

Thus, evaluation engine 900 includes discriminator 922. This is where the Who-What-Why-Where-When-How evaluations are made based upon the continuous input of current and expected future motivations and economic considerations in information security. A function of discriminator 922 is to parse out "loser elements" from "viable" or "winner elements." It is only the "winner elements" that are reconstructed into an evolved element that then becomes a component of a final reconstruction of the winning evolved output Base, B' 914'. Thus, discriminator 922 accepts inputs from library of known elements 924 and library of new elements 926 in order to perform its analysis. Cycle storage tracker and bit type analyzer 920 tracks modified elements.

Tables 2 and 3 below together present a simplified example of the evolution/evaluation process for a simple example where CAT is a threat to a prey (scenario), or an existing piece of malware in our known malware library, and DOG is a future piece of pro-ware (threat mitigator), malware (new evolutionary threat), or anti-malware (anti-threat). Table 2 presents a simplified example of evolution of the concept of malware (CAT) into pro-ware (DOG).

TABLE 2

| EVALUATION ISSUE based upon evolution | CAT - DOG EXAMPLE | CYBER ISSUE |
|---|---|---|
| CAT = Malware or Threat | CAT evolves overtime from sabre cat into numerous domestic and wild cats (lions, tigers, pussy cats, etc.). CAT is a predator of mice and birds and classified as a threat. | Existing malware is designed for increasingly complex defense DOG systems. |
| DOG = Pro-ware, Malware, or Anti-Malware | DOG evolves over time from wolf into numerous domestic and wild dogs (dingo, old wolf, etc.). DOG is a predator but of a different and unknown from of CAT Plus, domestic breeders cross breed various lines to get new characteristics. | DOG is evolved from increasingly complex (real & designed or hypothetical threats - the evolved CAT into a new threat or anti-threat DOG. |

In Table 3, the evolution follows a random modification of the original CAT and each evolved generation is tested on the Who, What, Where, When, Why and How criteria using the Bayes' Probability criteria as a generator for the efficacy of the new generation.

TABLE 3

| SIMPLE CAT - DOG CYCLE EVOLUTION & EVALUATION | CRITERIA | BAYES' PROBABILITY OF EFFICACY |
|---|---|---|
| CAT = A Malware Base | | |
| COT | Potential strange Winner | False attractor for Malware - invites CAT to hibernate - or Malware attractor for Pro-ware, P = 0.3 |
| COP | Loser | COP is a threat to criminals, but not a threat to the same threat arena as CAT, P = 0.4 - or COP could be an agent from the CAT-pound ready to catch CAT |
| HOP | Loser | HOP is a CAT tactic, but not the complete threat to the CAT prey, P = 0.6 |
| HOT | Loser | HOT may make the CAT lazy and therefore less of a threat to prey, P = 0.7 |
| XOT | Loser | Nonsense, P = 0.0 |
| DOT | Loser | Real but Not relevant threat to prey, P = 0.1 |
| DOG | Winner | Winner as either Pro-ware or New Malware as a potential threat to prey, P = 0.9 |
| | WHO - WHAT | Size CAT >=< DOG, P = 0.5 |
| | WHERE | CAT territory <=> DOG territory, P = 0.5 |
| | WHEN | CAT nocturnal - DOG diurnal, P = 0.8 |
| | WHY | DOG & CAT natural enemies, P = 0.9 |
| | HOW | Direct combat, P = .3 Fight - Flee, P = .5 Face off scare tactics, P = .4 Retreat from threats, P = .6 Others, etc., P = .7 |
| DOG | | DOG becomes an input to the library as Pro-Ware or Anti-Malware and also a potential Malware in a different threat environment where the prey is fox and the scenario is the hunt |

Figure 10:
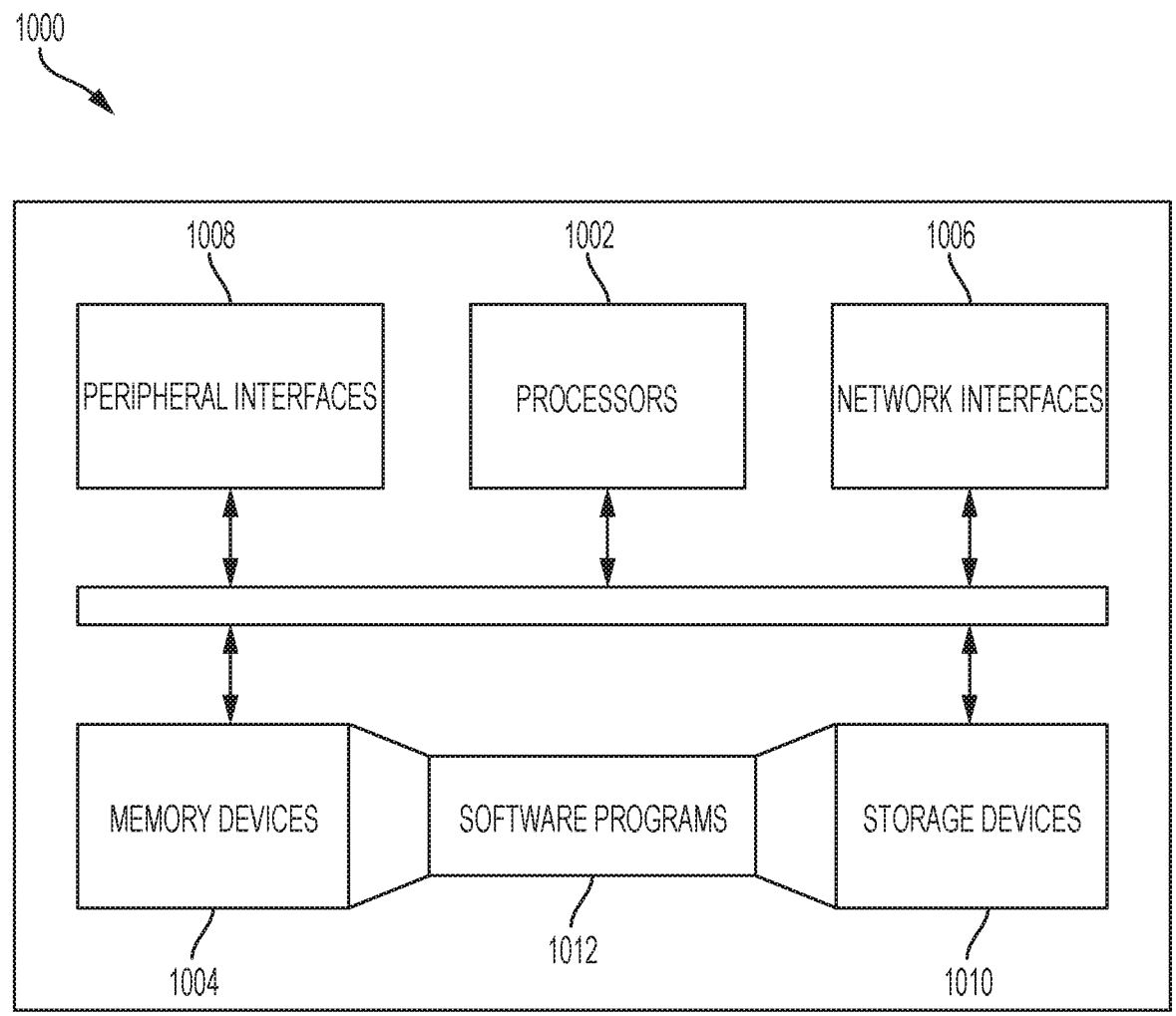
FIG. 10 is a schematic diagram of an example hardware implementation according to various embodiments.

FIG. 10 illustrates a schematic view of a computing or processor system 1000, according to an embodiment. The processor system 1000 may include one or more processors 1002 of varying core configurations (including multiple cores) and clock frequencies. The one or more processors 1002 may be operable to execute instructions, apply logic, etc. It will be appreciated that these functions may be provided by multiple processors or multiple cores on a single chip operating in parallel and/or communicably linked together. In at least one embodiment, the one or more processors 1002 may be or include one or more graphical processing units.

The processor system 1000 may also include a memory system, which may be or include one or more memory devices and/or computer-readable media 1004 of varying physical dimensions, accessibility, storage capacities, etc. such as flash drives, hard drives, disks, random access memory, etc., for storing data, such as images, files, and program instructions for execution by the processor 1002. In an embodiment, the computer-readable media 1004 may store instructions that, when executed by the processor 1002, are configured to cause the processor system 1000 to perform operations. For example, execution of such instructions may cause the processor system 1000 to implement one or more portions and/or embodiments of the methods described herein.

The processor system 1000 may also include one or more network interfaces 1006. The network interfaces 1006 may include any hardware, applications, and/or other software. Accordingly, the network interfaces 1006 may include Ethernet adapters, wireless transceivers, peripheral component interconnect (PCI) interfaces, and/or serial network components, for communicating over wired or wireless media using protocols, such as Ethernet, wireless Ethernet, etc.

The processor system 1000 may further include one or more peripheral interfaces 1008, for communication with a display screen, projector, keyboards, mice, touchpads, sensors, other types of input and/or output peripherals, and/or the like. In some implementations, the components of processor system 1000 need not be enclosed within a single enclosure or even located in close proximity to one another, but in other implementations, the components and/or others may be provided in a single enclosure.

The memory device 1004 may be physically or logically arranged or configured to store data on one or more storage devices 1010. The storage device 1010 may include one or more file systems or databases in any suitable format. The storage device 1010 may also include one or more software programs 1012, which may contain interpretable or executable instructions for performing one or more of the disclosed processes. When requested by the processor 1002, one or more of the software programs 1012, or a portion thereof, may be loaded from the storage devices 1010 to the memory devices 1004 for execution by the processor 1002.

Those skilled in the art will appreciate that the above-described componentry is merely one example of a hardware configuration, as the processor system 1000 may include any type of hardware components, including any necessary accompanying firmware or software, for performing the disclosed implementations. The processor system 1000 may also be implemented in part or in whole by electronic circuit components or processors, such as application-specific integrated circuits (ASICs) or field-programmable gate arrays (FPGAs).

Certain examples described above can be performed in part using a computer application or program. The computer program can exist in a variety of forms, both active and inactive. For example, the computer program can exist as one or more software programs, software modules, or both, that can be comprised of program instructions in source code, object code, executable code or other formats, firmware program(s), or hardware description language (HDL) files. Any of the above can be embodied on a computer readable medium, which can include computer readable storage devices and media in compressed or uncompressed form. Exemplary computer readable storage devices and media include conventional computer system RAM (random access memory), ROM (read-only memory), EPROM (erasable, programmable ROM), EEPROM (electrically erasable, programmable ROM), and magnetic or optical disks or tapes.

Those skilled in the art will be able to make various modifications to the described examples without departing from the true spirit and scope. The terms and descriptions used herein are set forth by way of illustration only and are not meant as limitations. In particular, although the method has been described by examples, the steps of the method can be performed in a different order than illustrated or simultaneously. Those skilled in the art will recognize that these and other variations are possible within the spirit and scope as defined in the following claims and their equivalents.

What is claimed is:

1. A computer-implemented system for predicting and remediating malware threats in an electronic computer network, the system comprising:

an electronic persistent storage library implemented in electronic persistent storage and storing data representing a plurality of malware threats;

a computer-implemented evolution engine executing on at least one electronic processor communicatively coupled to the electronic persistent storage library and configured to receive the data representing the plurality of malware threats from the electronic persistent storage library and randomize data representing malware threats to generate data representing randomized malware threats, wherein the computer-implemented evolution engine comprises a randomizer comprising electronically stored implementations of a plurality of randomizing algorithms comprising two or more of: a bit extraction and manipulation algorithm, a signature reordering and relocation algorithm, a signature substitution algorithm, a signature recombination algorithm, a signature transfer engine, a signature obfuscation algorithm, or a generative artificial intelligence algorithm; and a computer-implemented evaluation engine executing on at least one electronic processor and communicatively coupled to an output of the computer-implemented evolution engine and to the electronic persistent storage library and configured to receive the data representing the randomized malware threats from the computer-implemented evolution engine and evaluate the data representing the randomized malware threats using a conditional probability of a new malware threat event based on contents of the electronic persistent storage library;

wherein the computer-implemented evaluation engine adds data representing positively evaluated randomized malware threats to the electronic persistent storage library for proactive detection of future malware threats in the electronic computer network.

2. The system of claim 1, further comprising a malware detection engine communicatively coupled to the electronic persistent storage library and to the electronic computer network and configured to detect malware in the electronic computer network corresponding to the positively evaluated randomized malware threats.

3. The system of claim 1, wherein the randomizer is configured to parse the data representing malware threats into individual concepts and to select and apply at least one of the randomizing algorithms to parts of the parsed data representing malware threats.

4. The system of claim 1, wherein the evaluation engine comprises a Bayesian probability analysis generator.

5. The system of claim 1, wherein the system is installed on the electronic computer network and configured to continuously add detected malware threat data to the electronic persistent storage library.

6. The system of claim 1, wherein the electronic persistent storage library comprises a portion for storing data representing factual malware threats and a portion for storing data representing fictional malware threats.

7. The system of claim 1, wherein the evolution engine comprises a probability generator configured to evaluate probabilities that the randomized malware threats are valid malware threats.

8. A computer-implemented method for predicting and remediating malware threats in an electronic computer network, the method comprising:
   storing, in an electronic persistent storage library, data representing a plurality of malware threats;
   randomizing, by a computer-implemented evolution engine communicatively coupled to the electronic persistent storage library, data representing malware threats to generate data representing randomized malware threats, wherein the randomizing comprises randomizing by a plurality of randomizing algorithms comprising two or more of: a bit extraction and manipulation algorithm, a signature reordering and relocation algorithm, a signature substitution algorithm, a signature recombination algorithm, a signature transfer engine, a signature obfuscation algorithm, or a generative artificial intelligence algorithm; and
   evaluating, by a computer-implemented evaluation engine communicatively coupled to an output of the computer-implemented evolution engine and to the electronic persistent storage library, the data representing the randomized malware threats using a conditional probability of a new malware threat event based on contents of the electronic persistent storage library;
   wherein the computer-implemented evaluation engine adds data representing positively evaluated randomized malware threats to the electronic persistent storage library for proactive detection of future malware threats in the electronic computer network.

9. The method of claim 8, further comprising detecting, by a malware detection engine communicatively coupled to the electronic persistent storage library and to the electronic computer network, malware in the electronic computer network corresponding to the positively evaluated randomized malware threats.

10. The method of claim 8, wherein the randomizing further comprises parsing the data representing malware threats into individual concepts and selecting and applying at least one of the randomizing algorithms to parts of the parsed data representing malware threats.

11. The method of claim 8, further comprising evaluating, by a Bayesian probability generator of the evaluation engine, the conditional probability of the new malware threat event based on contents of the electronic persistent storage library.

12. The method of claim 8 further comprising continuously detecting malware threats in the electronic computer network, and adding to the electronic persistent storage library, malware threat data.

13. The method of claim 8, the method further comprising storing data representing factual malware threats in a portion of the electronic persistent storage library for storing data representing factual malware threats, and storing data representing fictional malware threats in a portion of the electronic persistent storage library for storing data representing fictional malware threats.

14. The method of claim 8, further comprising evaluating, by a probability generator of the evolution engine, probabilities that the randomized malware threats are valid malware threats.

15. A non-transitory computer readable media comprising instructions that, when executed by at least one electronic processor, configure the at least one electronic processor to perform a method for predicting and remediating malware threats in an electronic computer network by performing actions comprising:
   storing, in an electronic persistent storage library, data representing a plurality of malware threats;
   randomizing, by a computer-implemented evolution engine communicatively coupled to the electronic persistent storage library, data representing malware threats to generate data representing randomized malware threats, wherein the randomizing comprises randomizing by a plurality of randomizing algorithms comprising two or more of: a bit extraction and manipulation algorithm, a signature reordering and relocation algorithm, a signature substitution algorithm, a signature recombination algorithm, a signature transfer engine, a signature obfuscation algorithm, or a generative artificial intelligence algorithm; and
   evaluating, by a computer-implemented evaluation engine communicatively coupled to an output of the computer-implemented evolution engine and to the electronic persistent storage library, the data representing the randomized malware threats using a conditional probability of a new malware threat event based on contents of the electronic persistent storage library;
   wherein the computer-implemented evaluation engine adds data representing positively evaluated randomized malware threats to the electronic persistent storage library for proactive detection of future malware threats in the electronic computer network.

16. The non-transitory computer readable media of claim 15, wherein the actions further comprise detecting, by a malware detection engine communicatively coupled to the electronic persistent storage library and to the electronic computer network, malware in the electronic computer network corresponding to the positively evaluated randomized malware threats.

17. The non-transitory computer readable media of claim 15, wherein the randomizing further comprises parsing the data representing malware threats into individual concepts and selecting and applying at least one of the randomizing algorithms to parts of the parsed data representing malware threats.

18. The non-transitory computer readable media of claim 15, wherein the actions further comprise evaluating, by a Bayesian probability generator of the evaluation engine, the conditional probability of the new malware threat event based on contents of the electronic persistent storage library.

19. The non-transitory computer readable media of claim 15, wherein the actions further comprise continuously detecting malware threats in the electronic computer network, and adding to the electronic persistent storage library, malware threat data.

20. The non-transitory computer readable media of claim 15, wherein the actions further comprise storing data representing factual malware threats in a portion of the electronic persistent storage library for storing data representing factual malware threats, and storing data representing fictional malware threats in a portion of the electronic persistent storage library for storing data representing fictional malware threats.

* * * * *